Figure 1:
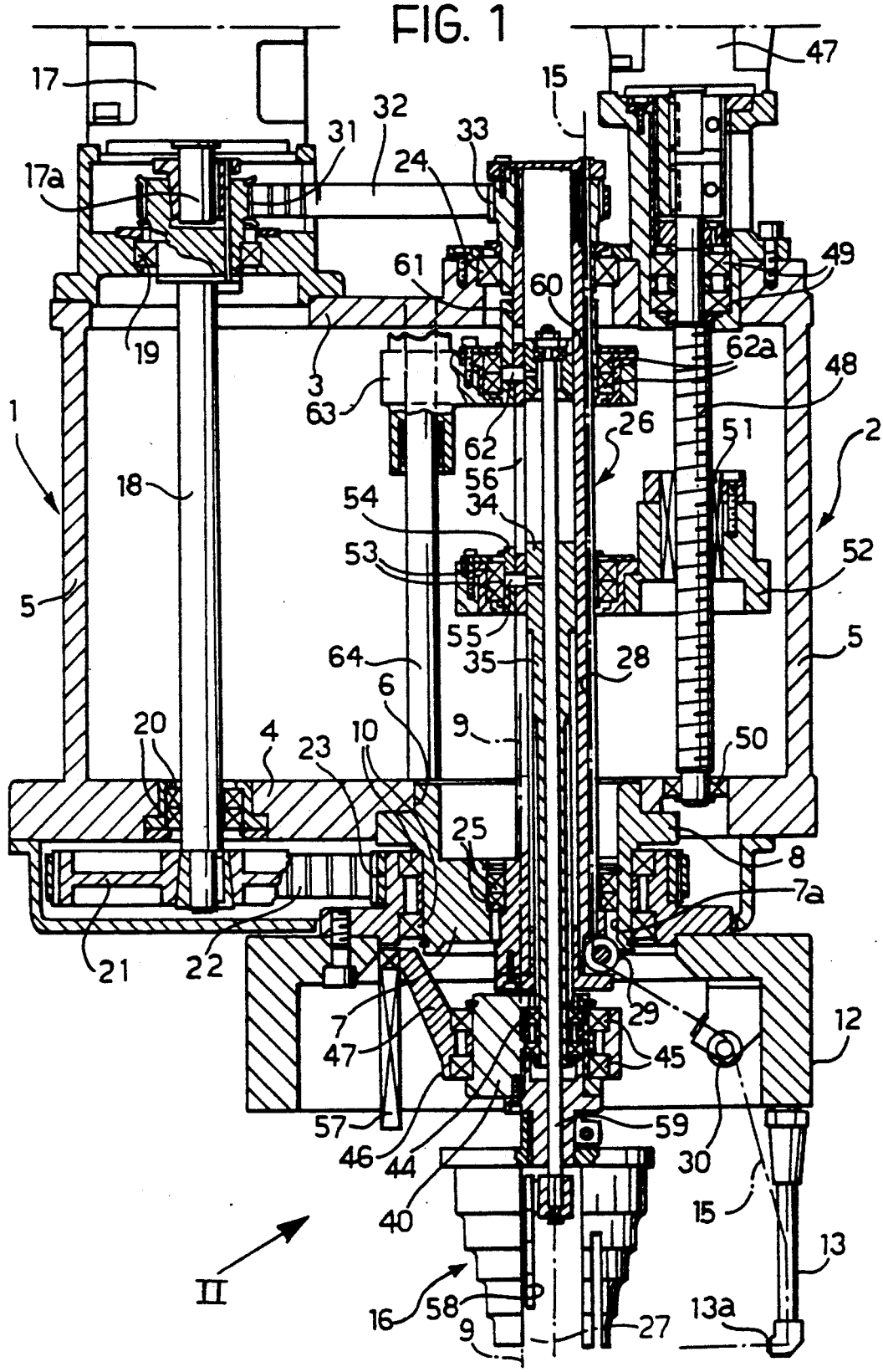

United States Patent [19]

Orecchia

[11] Patent Number: 5,251,678
[45] Date of Patent: Oct. 12, 1993

[54] DEVICE FOR FORMING COILS FOR WINDINGS FOR DYNAMO-ELECTRIC MACHINES

[75] Inventor: Roberto Orecchia, Riva Presso Chieri, Italy

[73] Assignee: Axis S.p.A., Val Di Pesa, Italy

[21] Appl. No.: 819,818

[22] Filed: Jan. 13, 1992

[30] Foreign Application Priority Data

Mar. 13, 1991 [IT] Italy ............................ TO91A000181

[51] Int. Cl.[5] .............................................. B21F 03/04
[52] U.S. Cl. .................................................... 140/92.1
[58] Field of Search ........................................ 140/92.1

[56] References Cited

U.S. PATENT DOCUMENTS 3,510,939  5/1970  Smith ................................ 140/92.1
4,751,946  6/1988  Eminger ........................... 140/92.1

Primary Examiner—Lowell A. Larson
Attorney, Agent, or Firm—Robert R. Jackson; Robert W. Morris

[57] ABSTRACT

In a device for forming coils for windings for dynamo-electric machines, the means for preventing rotation of the form on which the coil is wound comprise a member which supports the form and is mounted on the shaft of the device so as to be freely rotatable relative to the shaft and to the winding head about separate axes.

8 Claims, 3 Drawing Sheets

DEVICE FOR FORMING COILS FOR WINDINGS FOR DYNAMO-ELECTRIC MACHINES

The present invention relates to devices for forming coils for windings for dynamo-electric machines, of the known type including:

a form on which the coil is to be wound, a head for winding the coil on the form, the head being supported by a fixed support structure so as to be rotatable around the form, means for rotating the winding head, a shaft which is mounted on the fixed structure so as to be rotatable about an axis parallel to the axis of rotation of the winding head and has means for guiding a winding wire towards the winding head, and means for rotating the shaft in synchronism with the winding head, the form being mounted on the shaft so that it can rotate freely about the axis thereof, the device also including means for preventing the form from rotating.

A device of the type indicated above has been produced and marketed by the Applicant for some time. In this known device, the winding head is connected for rotation with the shaft of the device whilst—as indicated above—the form can rotate freely on the shaft. An epicyclic transmission connects the form both to the winding head and to a fixed ring gear and is arranged so that the rotation imparted to the form relative to the shaft is equal and opposite to that imparted to the shaft, so that the form does not rotate relative to a fixed observer. More specifically, the winding head rotates at least one peripheral shaft carrying a pair of planet gears connected by respective toothed belts to the fixed ring gear and to a gear fixed to the form.

The known device has been found to operate completely effectively and reliably, but the bearings which support the planet gears for rotation about their axes have to be of a size suitable to allow for the centrifugal forces to which the bearings are subject when the planet gears are rotated about the axis of the device at a very high speed.

The object of the present invention is to provide a device of the type indicated at the beginning, in which the means for preventing the form from rotating avoid the problem mentioned above.

In order to achieve this object, the subject of the invention is a device of the type indicated at the beginning of the present description, characterised in that the winding head and the shaft of the device rotate about separate axis, and in that the means for preventing the form from rotating include a body which supports the form and can rotate freely relative to the shaft about the axis thereof and also relative to the winding head about the axis of rotation thereof.

Since the winding head and the shaft of the device are rotated about separate axes, and since the form is freely rotatable relative to both these components about their respective axes, it cannot rotate relative to either of those axes. The form is thus prevented from rotating in a very simple manner which at the same time overcomes the problem of the known solution described above.

Figure 2:
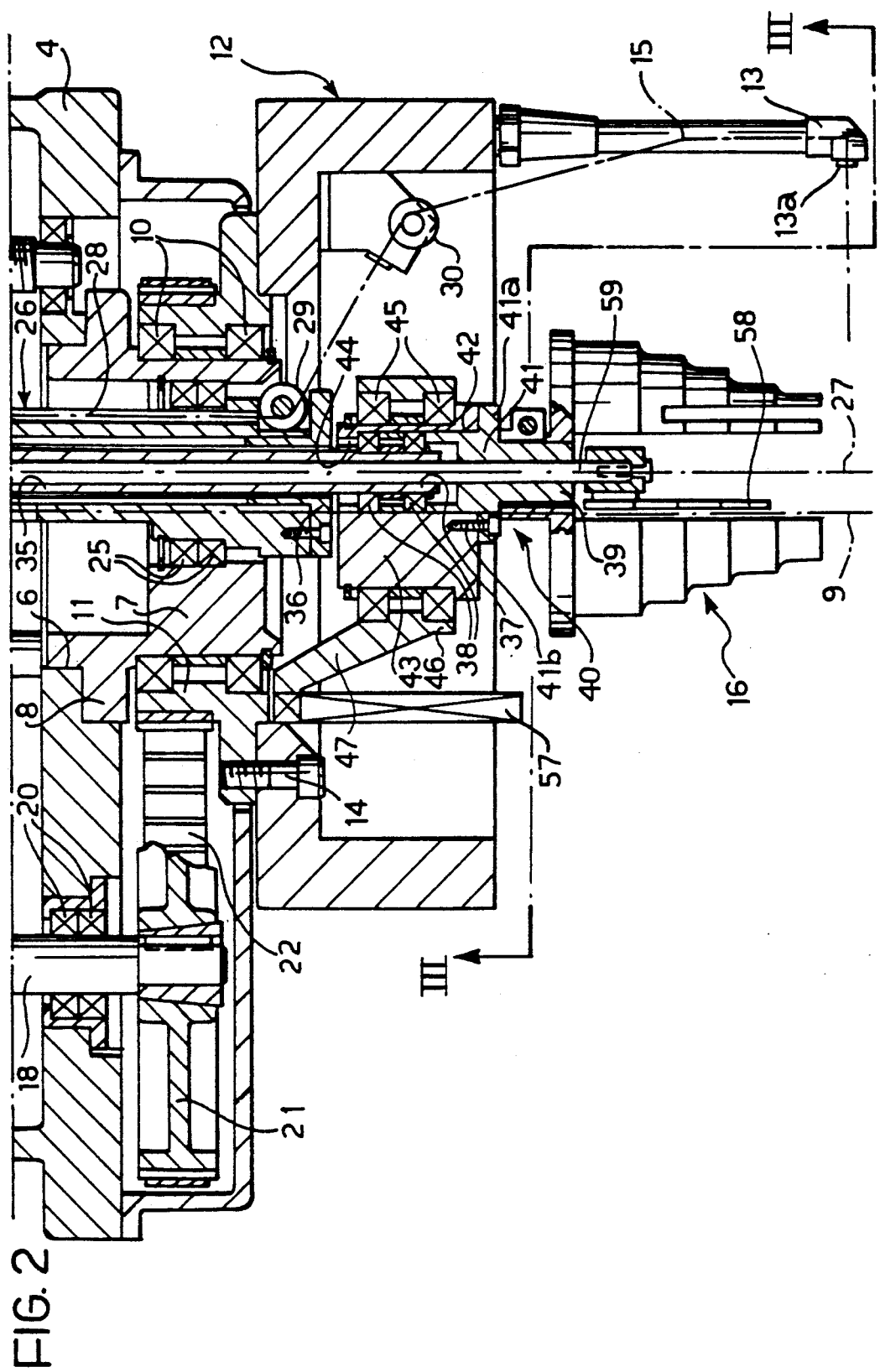
Figure 3:
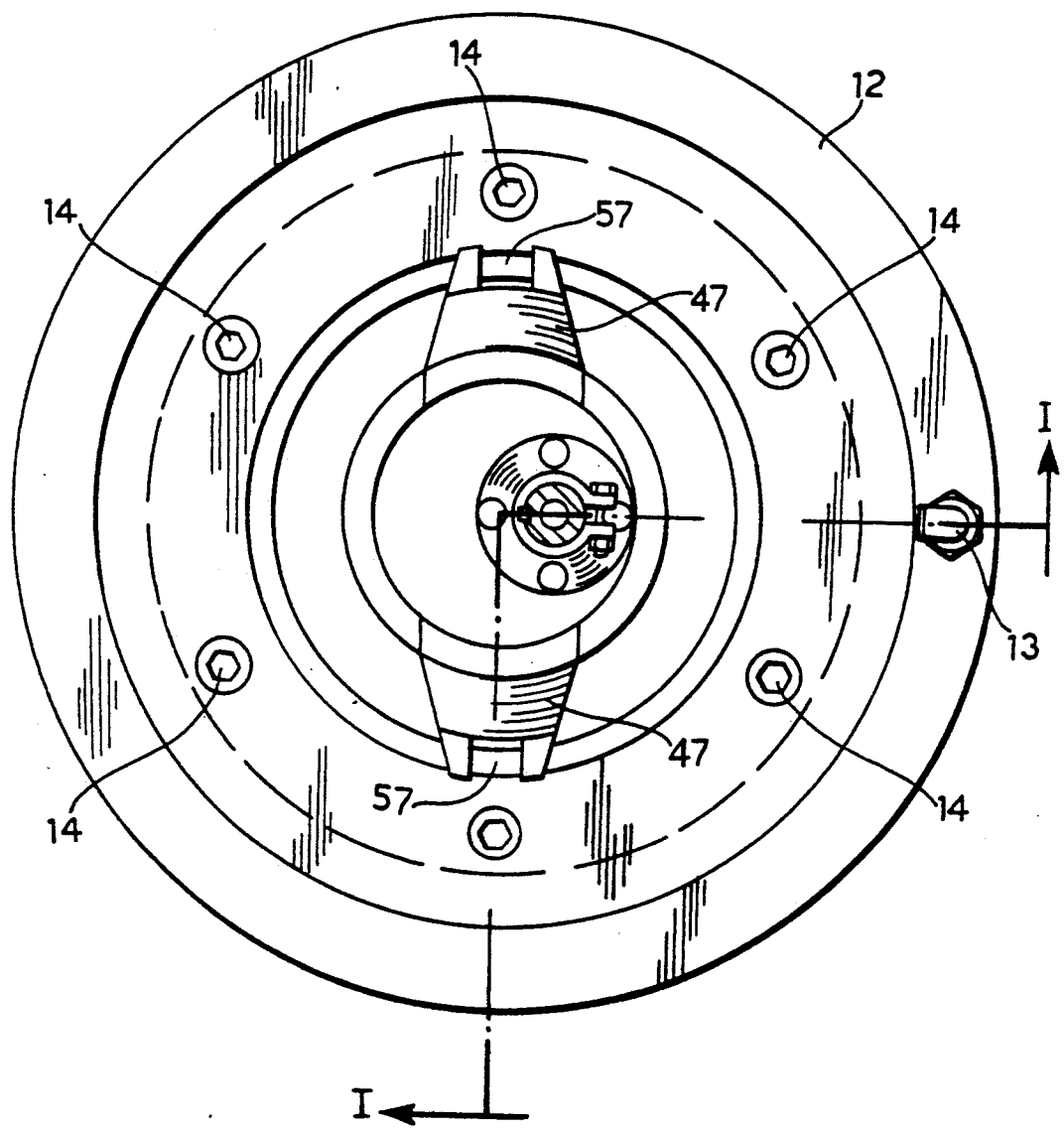

The invention will be understood better in the light of the description which follows with reference to the appended drawings provided purely by way of non-limiting example, in which:

FIG. 1 is a sectional view of a preferred embodiment of the device according to the invention, taken on the line I—I of FIG. 3, FIG. 2 is a view of the detail II of FIG. 1, on an enlarged scale, and FIG. 3 is a section taken on the line III—III of FIG. 2.

In FIG. 1, a device for the high-speed winding of a coil of copper wire to form a winding for a dynamo-electric machine is generally indicated 1. The device 1 includes a fixed support structure 2 which is intended to be supported by the base of the machine (not shown) in any known manner. In the embodiment illustrated, the fixed support structure 2 includes an upper plate 3 and a lower plate 4 joined by vertical walls 5. The lower wall 4 has a circular aperture 6 which houses a tubular end portion of a cylindrical body 7, a flange 8 of which is fixed to the lower plate 4 by screws (not shown).

With particular reference to FIG. 2, the fixed cylindrical body 7 supports for rotation about its axis 9, by means of rolling bearings 10, the hub 11 of a bell-shaped member 12 which carries a head 13 for winding the wire. In the embodiment illustrated, the hub 11 is constituted by a body separate from the body of the bell-shaped member 12 and is fixed thereto by screws 14 (see also FIG. 3). The winding head 13, which is of known type, is supplied (in a manner which will be described in further detail below) with a copper wire 15 which is unwound by an output end 13a of the head 13 and winds the wire 15 onto a form 16 as a result of the rotary movement imparted to the bell-shaped member 12 about the axis 9.

The bell-shaped member 12 is rotated about the axis 9 by an electric motor 17 (shown partially in FIG. 1) which is supported on the upper plate 3 of the fixed structure 2 and the output shaft 17a of which is connected for rotation with a coaxial shaft 18, the ends of which are supported for rotation by the plates 3 and 4 by means of rolling bearings 19, 20. The shaft 18 has a lower end which projects below the plate 4 and to which is keyed a gear 21 connected by means of a toothed belt 22 to a gear 23 mounted on the hub 11 of the bell-shaped member 12.

A shaft 26, the axis 27 of which is parallel to and spaced from the axis 9, is supported for rotation, by means of rolling bearings 24, 25, by the upper plate 3 of the fixed structure 2 and by the internal wall 7a of the tubular, cylindrical body 7 which is fixed to the plate 4. The shaft 26 has an axial duct 28 through which the copper wire 15 supplied to the winding head 13 is guided. The copper wire 15, which comes from known wire-supply means (not shown), enters the axial duct 28 at the upper end of the shaft 26 and emerges near the lower end of the shaft. At the outlet of the duct 28, the wire 15 engages a first guide wheel 29 carried by the shaft 26 and then a second guide wheel 30 carried by the bell-shaped member 12. The shaft 26 is rotated about its axis 27 in synchronism with the rotation of the bell-shaped member 12 about the axis 9.

The shaft 26 is rotated about its axis 27 by the same electric motor 17 by means of a gear 31 which is keyed to the output shaft 17a and meshes with a toothed belt 32 which is connected to a gear 33 mounted on the upper end of the shaft 26.

The shaft 26 is tubular. A body 34, which is slidable in the tubular body of the shaft 26, is extended by a shaft 35 which is connected for rotation with the shaft 26. The shaft 35 is splined and engages an internally splined bush 36 (FIG. 2) an annular flange of which is screwed to the lower end surface of the shaft 26. The shaft 35 has a lower end portion 37 which projects below the flange of the bush 36. The form 16 is mounted idly, by means of rolling bearings 38 (FIG. 2), on the end portion 37 of the shaft 35 which projects from the shaft 26. More precisely, the form 16 is fixed axially and prevented from rotating (the details of this fixing are not shown since they are of known type) on a shank 39 of a support member, generally indicated 40. In the embodiment illustrated, the support member 40 has a first element 41 which includes the shank 39 and the opposite end of which has a tubular appendage 42 coaxial with the shaft 28. The support member 40 also includes a second element 43 constituted by a cylindrical body which is supported (in a manner which will be described below) so that its axis coincides with the axis 9 of the bell-shaped member 12. The cylindrical body 43 has an eccentric, axial, cylindrical cavity 44 the axis of which coincides with the axis 27 of the shaft 26. The appendage 42 of the element 41 is inserted in the cavity 44 and has an annular flange 41a which is fixed to the element 43 by screws 41b. The cavity 44 also houses the end portion 37 of the shaft 35. The bearings 38 are interposed between the end portion 37 and the wall of the cavity 44. The element 43, and hence the form 16, is thus free to rotate relative to the shaft 26 about the axis 27 thereof.

The element 43 can also rotate freely, by means of bearings 45, in a hub 46 carried by the bell-like member 12 in a manner which will be described in detail below. When the shaft 26 rotates, the end portion 37, which is connected for rotation with the shaft 26, rotates freely, by means of bearings 38, in the cavity 44 of the body 40 which supports the form 16. At the same time, the hub 46 rotates freely about the element 43, by means of the bearings 45, as a result of the rotation of the bell-shaped member 12. The form 16 does not rotate whilst the bell-shaped member 12 and the shaft 26 are rotating since it is free to rotate about both the axes 9 and 27.

Whilst the wire is being wound around the form 16 by the winding head 13, the form 16 has to move vertically, in known manner. For this reason, the body 40 which supports the forming member 16 is mounted on the end portion 37 of the shaft 35 which can move vertically within the shaft 26. This vertical movement is achieved by means of an electric motor 47 (shown partially in FIG. 1) which is mounted on the upper plate 3 of the fixed structure 2 and which rotates a screw 48, the ends of which are supported for rotation in the plates 3, 4 by means of bearings 49, 50. The screw 48 engages a female threaded member 51 which is carried by a slide 52. The slide 52 carries a pair of bearings 53 which support an idle sleeve 54 which is slidable outside the shaft 26 and is fixed to the body 34 within the shaft 26 by means of a transverse pin 55 inserted through a longitudinal slot 50 in the shaft 26. The structure described above enables the form 16 to be moved vertically by the activation of the electric motor 47. The motor imparts a corresponding rotation to the screw 48, thus moving the slide 52 and hence the rod 35 vertically, as a result of engagement of the screw in the female threaded member 51. During the vertical movement of the member 40 which supports the form 16, the hub 46 moves axially together with the support member 40. The hub 46 has two radial arms 47 (see also FIG. 3) with fork-shaped outer ends which are slidable on two prismatic guide rods 57 which form part of the bell-shaped member 12. During the vertical movements of the form 16, the hub 46 thus continues to be connected for rotation with the bell-shaped member 12.

Upon completion of the winding of the coil, it is made to slide downwardly on the form 16 so as to fall onto receiving means arranged beneath the machine (for example, a device for fitting the winding formed into the recesses in the stator of a dynamo-electric machine). Within the form 16 (which is tubular) is a vertically movable ejector 58 for removing the coil. The ejector 58 is fixed to the lower end of a rod 59 which is slidable in the shaft 35 and has an upper end which is fixed axially but can rotate freely relative to a bush 60. The bush 60 is slidable in the tubular body of the shaft 26 and is fixed by means of a transverse pin 62, which engages the longitudinal slot 56, to an external bush 61 which is slidable on the outer surfaces of the shaft 26. The external bush 61 in turn is carried, by means of bearings 62a, by a slide 63 which is slidable on a cylindrical guide column 64 the ends of which are fixed to the plates 3, 4 of the fixed structure 2. The slide 63 is moved by a fluid cylinder (not shown).

The device described above operates as follows.

At the start of the winding operation, the forming shaft 16 is in the position shown in FIG. 1. The end of the copper wire 15 is fixed to the forming member in known manner and the bell-shaped member 12 is then rotated about the axis 9 by the activation of the shaft 17 so as to wind the wire around the form 16. The activation of the motor 17 rotates the shaft 26 and the bell-shaped member 12 simultaneously about separate axes 9, 27 (the distance between the guide wheels 29, 30 for the copper wire 15 varies during the course of each rotation). The shaft 26 nevertheless rotates in synchronism with the bell-shaped member 12 so as to ensure that the wire is supplied to the winding head 13 correctly. During the winding, the form 16 is moved vertically by the activation of the electric motor 47. During the winding operation, the form 16 is securely prevented from rotating since it is free to rotate about the two separate axes 9, 27 and therefore rotates neither about the axis 9 nor about the axis 27. Upon completion of the winding operation, the motor 17 is stopped and the slide 63 is moved downwardly to remove the coil by means of the ejector 58.

As can be seen, the device according to the invention solves the problem of preventing the form 16 from rotating during the winding of the coil in a particularly effective and simple manner.

Naturally, the principle of the invention remaining the same, the details of construction and forms of embodiment may be varied widely with respect to those described and illustrated purely by way of example, without thereby departing from the scope of the present invention.

What is claimed is:

1. A device for forming coils for winds for dynamo-electric machines, including:
   a form on which a coil is to be wound,
   a head for winding the coil on the form,
   a fixed support structure which supports the head for rotation around the form,
   means for rotating the winding head,
   a shaft which is mounted on the fixed support structure so as to be rotatable concentric with an axis parallel to the axis of rotation of the winding head and has means for guiding a winding wire towards the winding head, the form being mounted on the shaft so that it can rotate freely concentric with the axis thereof, means for rotating the shaft in synchronism with the winding head, and means for preventing the rotation of the form, wherein the winding head and the shaft of the device rotate about separate, laterally spaced axes, and the means for preventing the rotation of the form include a member which supports the form and can rotate freely relative to the shaft about the axis thereof and also relative to the winding head about the axis of rotation thereof.

2. A device according to claim 1, wherein the member for supporting the form includes a cylindrical body having an axis which coincides with the axis of rotation of the winding head and defining an eccentric axial cavity in which an end portion of the said shaft is rotatable, bearings being interposed between the said shaft and the cavity, and the device includes a bell member for supporting the winding head and a hub which is connected for rotation with the bell member and in which the cylindrical body is freely rotatable, bearings being interposed between the hub and the cylindrical body.

3. A device according to claim 2, wherein the hub has a plurality of radial arms and the bell has axial guide rods on which the outer ends of the radial arms are slidable axially.

4. A device according to claim 2, wherein the end portion on which the body for supporting the form is freely rotatable is part of a further shaft which is slidable in the said shaft and is connected for rotation therewith.

5. A device according the claim 4, wherein it has male-and-female threaded means for the axial movement of the further shaft which is slidable in the said shaft.

6. A device according to claim 1, wherein the means for rotating the winding head and the said shaft include a single electric motor connected to a member for supporting the winding head and to the shaft by two different belt transmissions.

7. A device according to claim 1, wherein it includes a member for supporting the winding head and wherein the guide means for the winding wire include an axial duct in the said shaft and at least two guide wheels carried by the shaft and by the member for supporting the winding head, respectively.

8. A device according to claim 1, wherein the fixed support structure includes a cylindrical body having an eccentric cavity, a member for supporting the winding head, bearings which support the said member for rotation on the body, and bearings which mount the said shaft for rotation in the eccentric cavity.

* * * * *

UNITED STATES PATENT AND TRADEMARK OFFICE
CERTIFICATE OF CORRECTION

PATENT NO. : 5,251,678
DATED : October 12, 1993
INVENTOR(S) : Roberto Orecchia

It is certified that error appears in the above-identified patent and that said Letters Patent is hereby corrected as shown below:

Column   Line 1      52    "axis" should be -- axes --.

4      57    "winds" should be -- windings --.

Signed and Sealed this

Twenty-second Day of November, 1994

Attest:

BRUCE LEHMAN

Attesting Officer        Commissioner of Patents and Trademarks